United States Patent
Higashiura et al.

(10) Patent No.: US 6,184,512 B1
(45) Date of Patent: *Feb. 6, 2001

(54) SEMICONDUCTOR LASER APPARATUS AND OPTICAL PICKUP APPARATUS

(75) Inventors: Kazuo Higashiura; Yoshio Hayashi; Tadashi Takeda, all of Nagano (JP)

(73) Assignee: Sankyo Seiki Mfg. Co., Ltd., Nagano-ken (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/082,385

(22) Filed: May 20, 1998

(30) Foreign Application Priority Data

May 22, 1997 (JP) .................................... 9-131970

(51) Int. Cl.[7] ........................................ G01J 1/20
(52) U.S. Cl. .................. 250/201.5; 369/44.23; 369/44.12
(58) Field of Search ............................ 356/128; 385/147, 385/94; 369/44.12, 44.23, 44.11, 44.14, 120–122, 112; 257/433; 250/201.5

(56) References Cited

U.S. PATENT DOCUMENTS 5,005,162 * 4/1991 Mitsumori et al. ............... 369/44.12
5,396,061 * 3/1995 Taniguchi et al. .................... 250/216
5,727,111 * 3/1998 Kume et al. .......................... 385/147
5,804,814 * 9/1998 Musha et al. ..................... 250/201.5
5,814,807 * 9/1998 Musha et al. ..................... 250/201.5

FOREIGN PATENT DOCUMENTS 4-349687   12/1992   (JP) .

* cited by examiner

Primary Examiner—Hoa Q. Pham
(74) Attorney, Agent, or Firm—Reed Smith Shaw & McClay LLP

(57) ABSTRACT

A semiconductor laser apparatus comprises a semiconductor substrate, a semiconductor laser which is fixed on the semiconductor substrate and a prism having a slanted plane. The prism is placed such that its slanted plane faces a side across from the semiconductor laser. The apparatus also includes an optical detector for monitoring which is formed on the surface of the semiconductor substrate. The surface is covered by the prism. The following are formed on the slanted plane of the prism: a reflection region on which the surface is processed for reflecting a part of an emitted light beam from the semiconductor laser and a transmissive refraction region on which the surface is processed such that the remaining part of the emitted light beam is transmitted and refracted to be guided to a light receiving plane of the optical detector for monitoring.

6 Claims, 6 Drawing Sheets

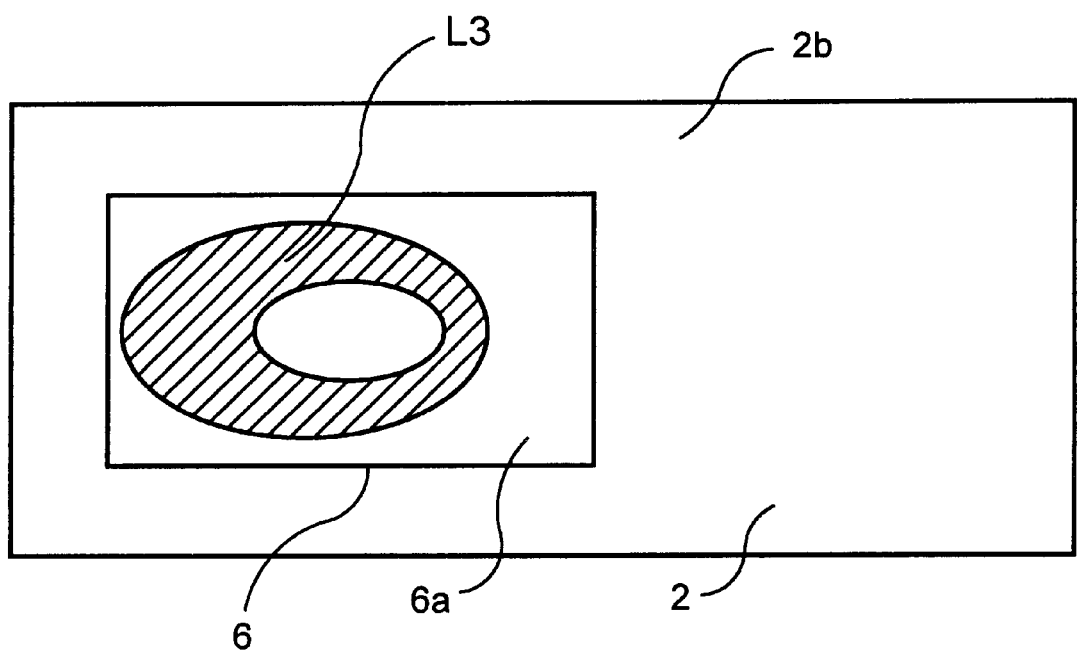
F I G. 3

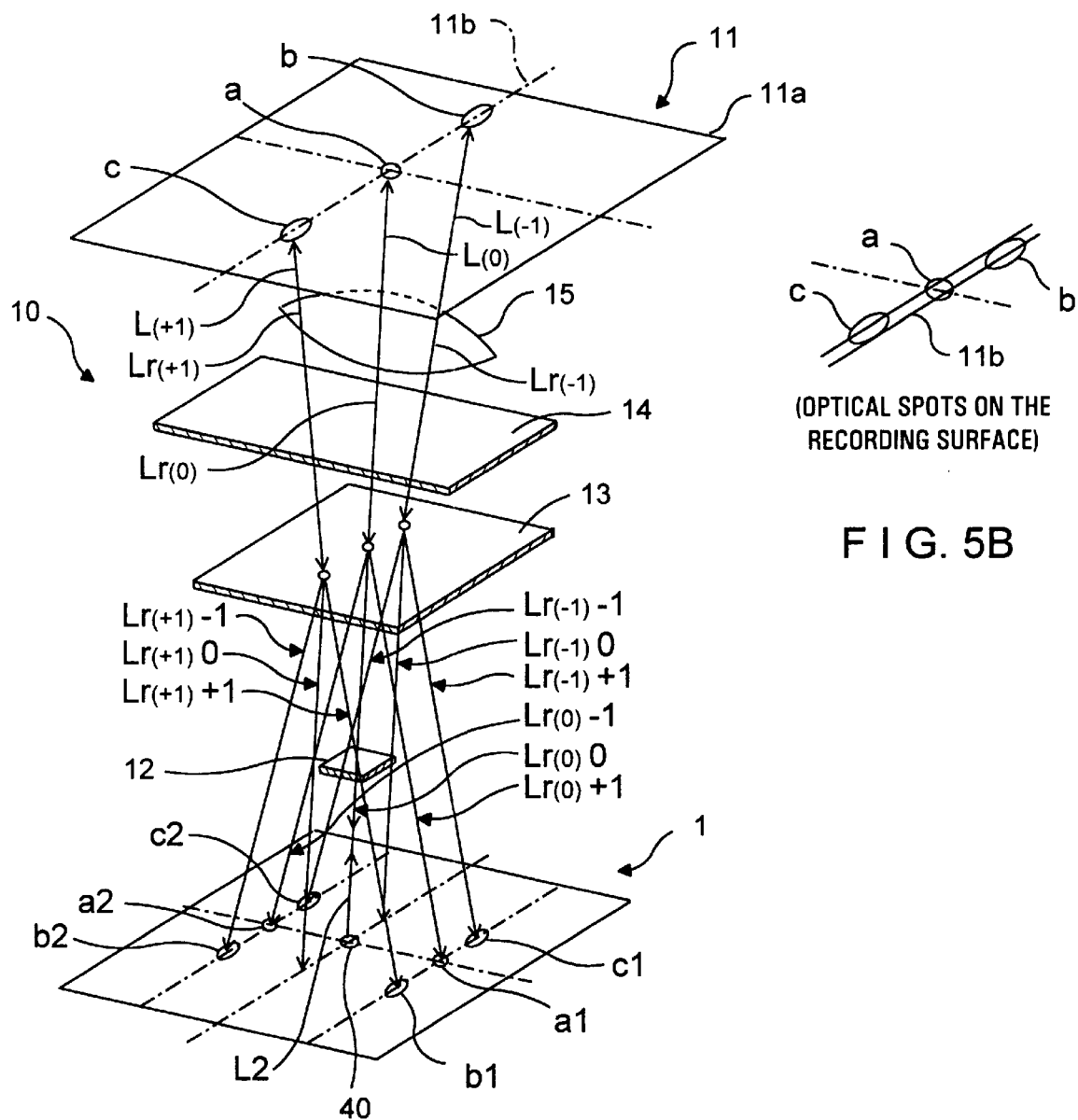
(OPTICAL SPOTS ON THE RECORDING SURFACE)
F I G. 5B
F I G. 5A

FRONT FOCAL POINT      BACK FOCAL POINT

FOCAL POINT (CHANGE IN THE SHAPE OF OPTICAL SPOTS)

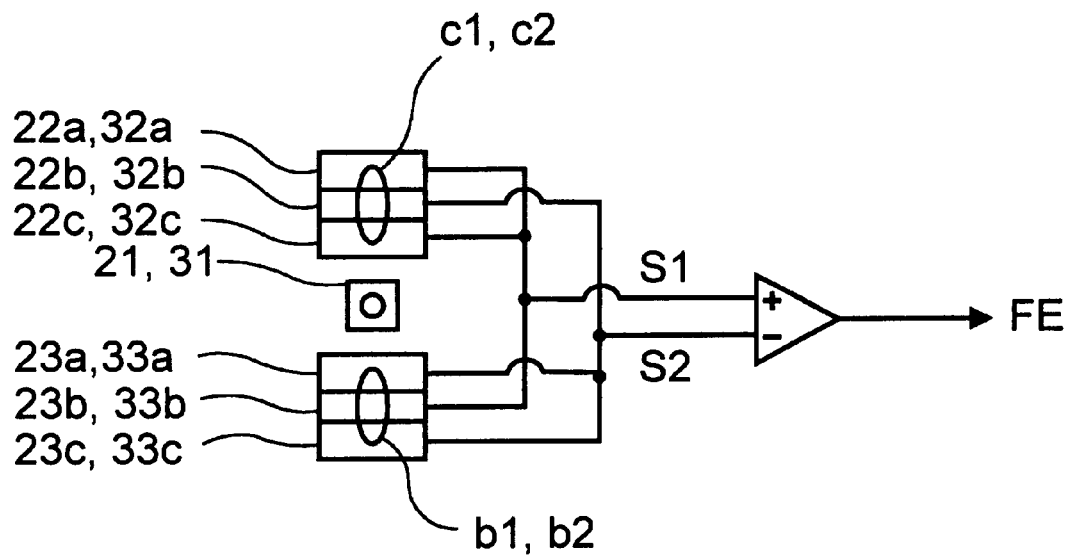
F I G. 6A
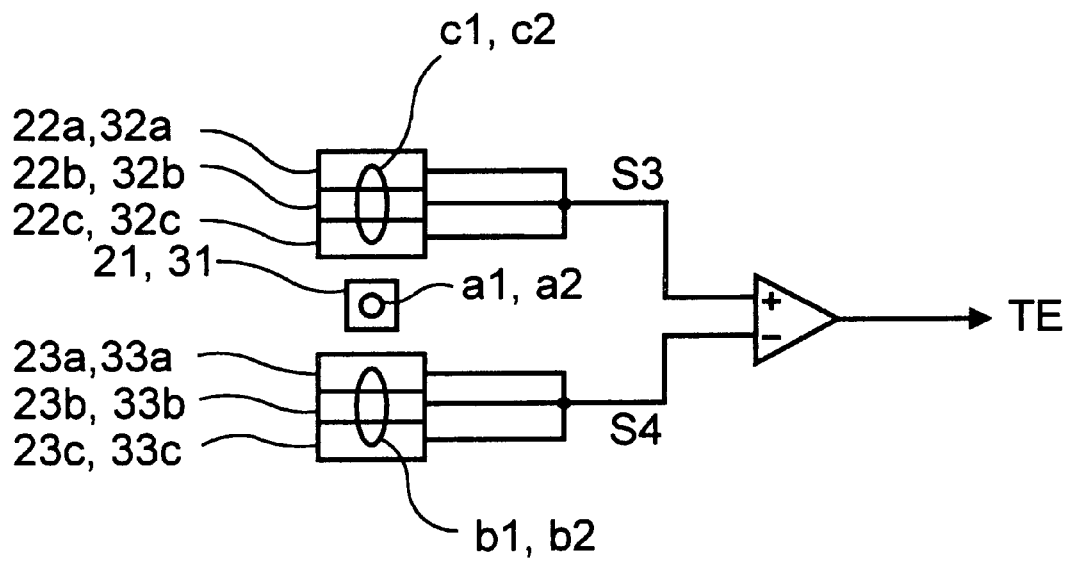
F I G. 6B

SEMICONDUCTOR LASER APPARATUS AND OPTICAL PICKUP APPARATUS

BACKGROUND OF THE INVENTION a) Field of the Invention

The present invention relates to a semiconductor laser apparatus used as a laser source of an optical pickup apparatus which records/reproduces information on an optical recording medium. More specifically, it relates to a semiconductor laser apparatus which feedback-controls the amount of light from a semiconductor laser.

b) Description of the Related Art

The amount of laser beam light (determined by the intensity of the laser beam light) emitted from a semiconductor laser largely varies depending on temperature and a change in time. Therefore, it is a common practice to feedback-control the amount of light from the semiconductor laser for obtaining a constant amount of light from the semiconductor laser. For example, in a semiconductor laser described in Tokkai H4-349687, a step is formed on the surface of a semiconductor substrate wherein a semiconductor laser is placed at the lower surface of the step and an optical detector for monitoring is formed on the side wall of the step. As a result, the semiconductor laser and the optical detector for monitoring are placed opposite from each other while an optical detector for detecting signals is formed at a location other than the side wall of the step.

Nonetheless, in the above semiconductor laser apparatus of Tokkai H4-349687, the configuration is such that the semiconductor laser and the optical detector for monitoring are placed opposite from each other by using a step formed on the semiconductor substrate. Therefore, a drawback exists in that the optical detector for monitoring cannot be formed on a semiconductor substrate having a flat surface; in turn, it is difficult to form the optical detector for detecting signals and the optical detector for monitoring on the same surface. As a result, the two optical detectors are formed in separate processes such that costs for manufacturing the semiconductor laser apparatus are dramatically increased.

If a light receiving plane of the optical detector for monitoring is formed on a semiconductor having a flat surface, on the other hand, only a small part of a laser beam emitted from the semiconductor laser reaches the light receiving plane; as a result, precision in detection of light beams deteriorates.

OBJECT AND SUMMARY OF THE INVENTION

Therefore, a primary object of the present invention is to provide a semiconductor laser apparatus in which a laser beam, emitted from a semiconductor laser horizontally in relation to a surface of a semiconductor substrate, can be effectively received in spite of an optical detector for monitoring having its light receiving plane on a flat surface of the substrate and to provide an optical pickup apparatus using the same.

In accordance with the invention, a semiconductor laser apparatus comprises a semiconductor substrate, a semiconductor laser which is fixed on the semiconductor substrate and a prism having a slanted plane. The prism is placed such that its slanted plane faces a side across from the semiconductor laser. The apparatus also includes an optical detector for monitoring which is formed on the surface of the semiconductor substrate. The surface is covered by the prism. The following are formed on the slanted plane of the prism: a reflection region on which the surface is processed for reflecting a part of an emitted light beam from the semiconductor laser and a transmissive refraction region on which the surface is processed such that the remaining part of the emitted light beam is transmitted and refracted to be guided to a light receiving plane of the optical detector for monitoring.

BRIEF DESCRIPTION OF THE DRAWINGS

In the drawings:

FIG. 3 shows a cross section of a light beam emitted on a light receiving plane of an optical detector for monitoring shown in FIG. 1;

FIGS. 5(A) through 5(D) explain an optical pickup apparatus using a semiconductor laser apparatus of the present invention; and FIGS. 6(A) and 6(B) shows a circuit configuration for generating various signals in the optical pickup apparatus shown in FIG. 5.

DESCRIPTION OF THE PREFERRED EMBODIMENTS

The following describes a semiconductor laser apparatus using the present invention in reference to drawings. The semiconductor laser apparatus of this embodiment employs a front monitoring method in which the amount of light (the intensity of the laser beam light) from the semiconductor laser is feedback-controlled based on the detection output of a part of a forward light beam from the semiconductor laser detected by an optical detector for monitoring.

Figure 1:
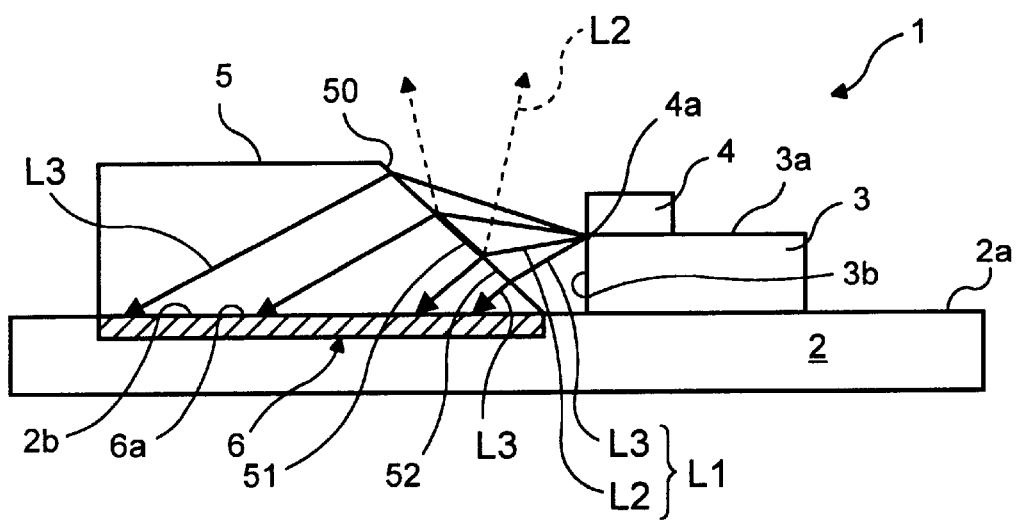
FIG. 1 is a side view of a principal part of a semiconductor laser of the present invention.
Figure 2:
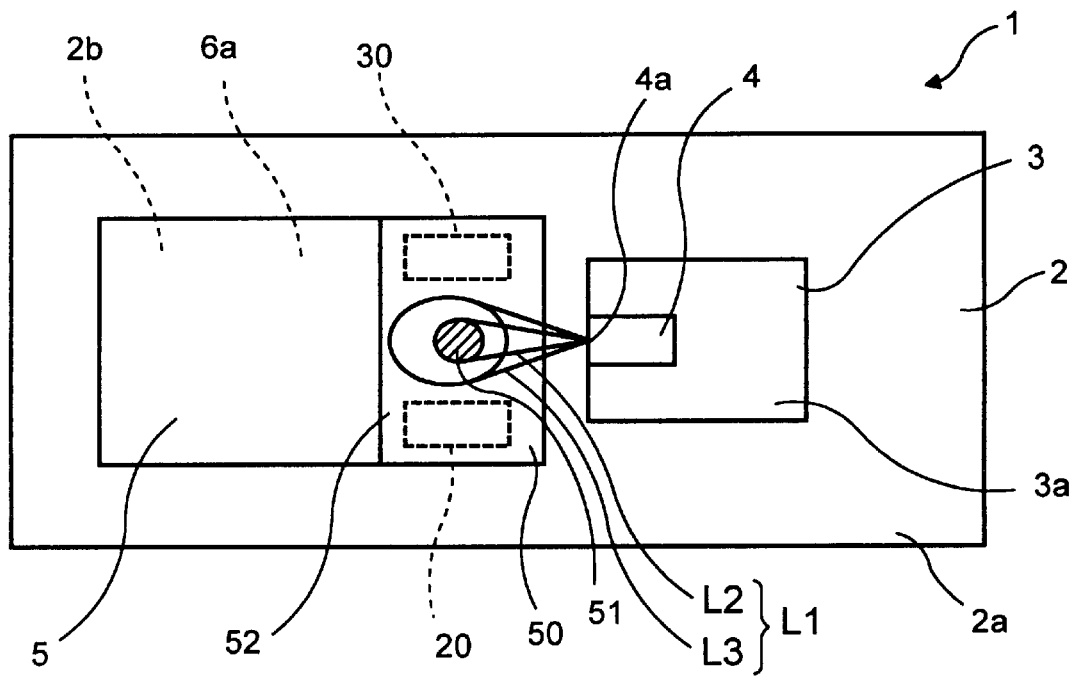
FIG. 2 is a plan view of the principal part of the semiconductor laser of FIG. 1.

FIG. 1 is a side view of a principal part of the semiconductor laser, and FIG. 2 is a plan view of the principal part of the semiconductor laser.

As shown in the figures, semiconductor laser apparatus 1 comprises semiconductor substrate 2 made of silicon and the like wherein approximately cubic submount 3 is fixed on surface 2a via an adhesive and the like. On submount 3, semiconductor laser 4 is mounted such that its emitting point 4a faces the side to emit laser beam L1 in the horizontal direction (horizontal to the substrate surface of semiconductor substrate 2). Semiconductor laser 4 is placed close to an edge of upper surface 3a of submount 3, which is close to side surface 3b, on the side where laser beam L1 is emitted; also, it is electrically connected to submount 3 and semiconductor substrate 2 by wire bonding and the like.

On surface 2a of semiconductor substrate 2, prism 5 is fixed at a position separated from side surface 3b of submount 3 by a given distance via an adhesive and the like. Prism 5 is positioned such that slanted plane 50, which is slanted to be non-horizontal to surface 2a of semiconductor substrate 2, faces emitting point 4a of semiconductor laser 4. In this embodiment, prism 5 has a structure such that slanted plane 50 is slanted by 45 degrees in relation to the optical axis of laser beam L1.

Light receiving plane 6a of optical detector 6 for monitoring is formed on surface portion 2b, which is covered by prism 5, of semiconductor substrate 2 such that light receiving plane 6a of optical detector 6 for monitoring is parallel to the optical axis of laser beam L1 emitted from semiconductor laser 4.

On slanted plane 50 of prism 5, reflection region 51, in which its surface is processed to reflect a part of laser beam L1 from semiconductor laser 4, and transmissive refraction region 52, which guides the remaining laser beam to light receiving plane 6a of optical detector 6 for monitoring by transmissive refraction, are formed. Reflection region 51 is given an optical reflective characteristic by surface processing such as coating the surface of slanted plane 50 with a metal layer. In this embodiment, reflection region 51 is formed as a circle as it is observed from the vertical direction of the semiconductor substrate wherein the circle is surrounded by transmissive refraction region 52. The optical axis of laser beam L1 is adjusted to go through the center of reflection region 51.

In semiconductor laser apparatus 1 structured as above, laser beam L1 is emitted from semiconductor laser 4 in the horizontal direction to illuminate slanted plane 50 of prism 5. Reflection region 51 is formed on slanted plane 50 to be surrounded by transmissive refraction region 52. Since the optical axis of laser beam L1 passes through the center of reflection region 51, laser beam L2, around the optical axis of laser beam L1 emitted from semiconductor laser 4, is used for recording/reproducing optical recording media an optical reflective characteristic, such as a CD and DVD, as mentioned later.

On the other hand, laser beam L3 emitted onto transmissive refraction region 52 (the remaining of laser beam L1 after removing laser beam L2) is transmissively refracted at transmissive refraction region 52, as indicated by a solid line in FIG. 1; thereafter, laser beam L3 is guided to light receiving plane 6a of optical detector 6 for monitoring, which is covered by prism 5 on surface portion 2b of semiconductor substrate 2. Hence, the amount of light (the intensity of the laser beam light) from semiconductor laser 4 can be feedback-controlled based on the results of light received by optical detector 6 for monitoring.

In this embodiment, as shown above, laser beam L1 emitted from semiconductor laser 4 to slanted plane 50 of prism 5 is horizontal to the surface of semiconductor substrate 2. Laser beam L2, which illuminates reflection region 51 of slanted plane 50, is used for recording/reproducing optical media such as a CD and a DVD; on the other hand, laser beam L3, which illuminates transmissive refraction region 52 of slanted plane 50, is transmissively refracted thereon to be guided to light receiving plane 6a of optical detector 6 for monitoring which is covered by prism 5 on surface portion 2b of semiconductor substrate 2. Therefore, even though optical detector 6 for monitoring is such that light receiving plane 6a is formed on flat surface portion 2b of semiconductor substrate 2, laser beam L3, which is the remaining of laser beam L1 from semiconductor laser 4 after removing laser beam L2 used for recording/reproducing, can be efficiently received. Also, illumination efficiency of semiconductor laser 4 can be increased by increasing reflectivity at the rear end of semiconductor laser 4 such that laser beam L1 is focusingly emitted in the forward direction in relation to semiconductor laser 4, in order to obtain both light beams L2 and L3 for recording/reproducing and for monitoring from laser beam L1 which is emitted in the forward direction.

In addition, when semiconductor laser 4 is directly positioned on surface 2a of semiconductor substrate 2, laser beam L1 emitted from semiconductor laser 4 has a spreading angle. Therefore, the amount of light, which is a part of laser L1 guided to slanted plane 50 after reflecting on surface 2a of semiconductor substrate 2, is decreased in the case that the distance between the emitting point to slanted plane 50 of prism 5 is long. In this embodiment, semiconductor laser 4 is placed on submount 3 which is fixed to surface 2a of semiconductor substrate 2. As a result, the entire laser beam L1 reaches slanted plane 50 such that a decrease in efficiency of a use of light due to the spreading angle can be prevented.

Figure 4A:
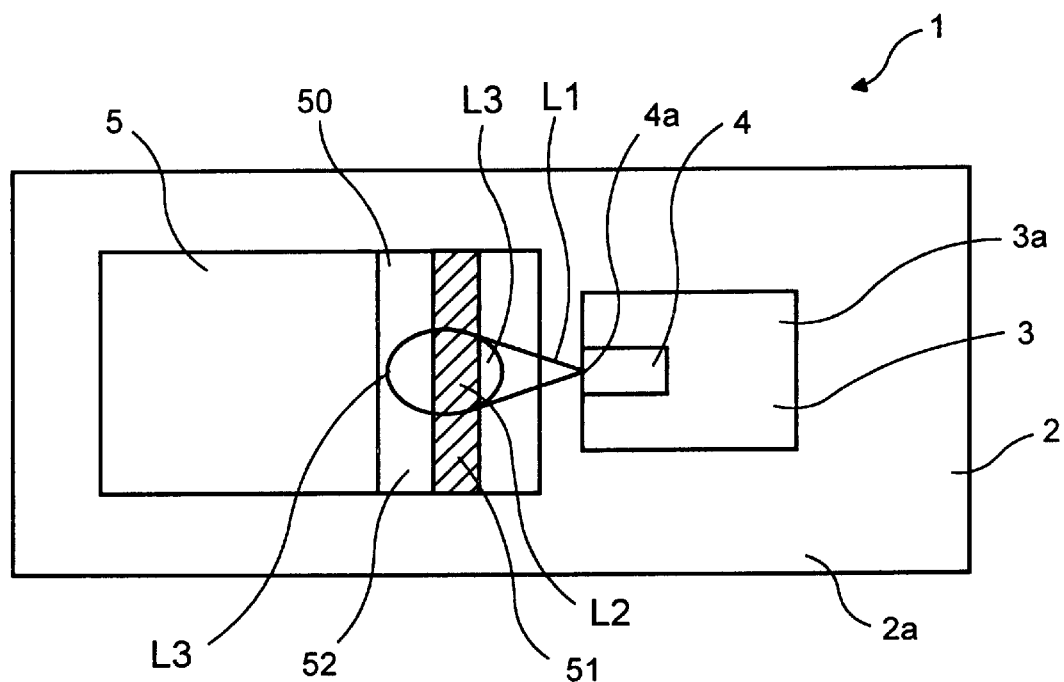
FIG. 4(A) is a plan view of a semiconductor laser apparatus of the present invention in which a stripe reflection region is formed on a slanted plane of a prism.
Figure 4B:
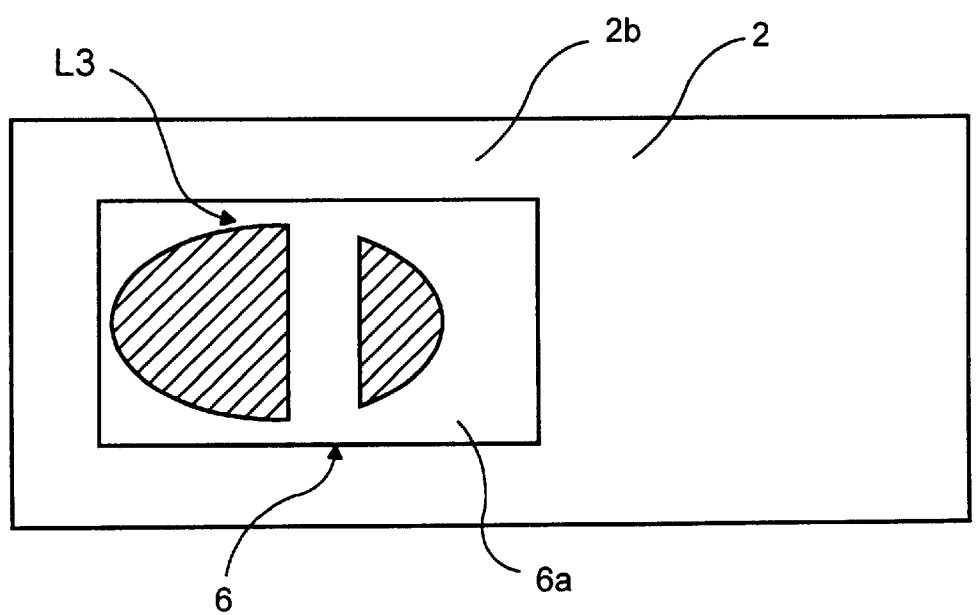
FIG. 4(B) shows a cross section of a light beam emitted on a light receiving surface of an optical detector for monitoring of the semiconductor laser apparatus shown in FIG. 4(A)

In the above embodiment, true circle reflection region 51 is formed at a part of slanted plane 50 of prism 5 such that reflection region 51 is placed within transmissive refraction region 52. However, it is possible to form reflection region 51 as a stripe sandwiched between transmissive refraction region 52, as shown in FIG. 4(A). In this case, as shown in FIG. 4(B), laser beam L3 is guided to light receiving plane 6a of optical detector 6 for monitoring with a partially shaded oval illumination pattern, as shown in FIG. 4(B).

If reflection region 51 is formed on slanted plane 50 as a stripe, as described above, mass production is possible; as a result, efficiency in production of prism 5 increases such that production costs can be decreased.

Application to an Optical Pickup Apparatus

The following describes an embodiment of an optical pickup apparatus using a semiconductor laser apparatus of the present invention.

Figure 5C:
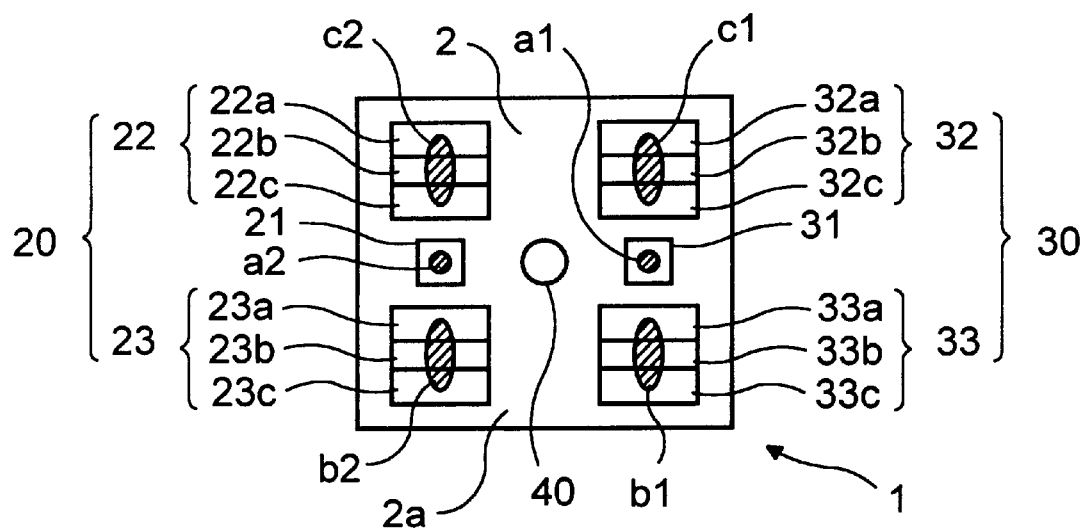

FIG. 5(A) is a schematic optical configuration of an optical pickup apparatus of the present invention. (B) is an optical spot formed on a recording surface of an optical recording medium. (C) is a schematic diagram showing a principle of signal detection by an optical detector for detecting signals which is added to the semiconductor laser apparatus. (D) shows changes in the shape of an optical spot formed on an optical detector for detecting signals. Also, in FIG. 5(C), the whole semiconductor laser apparatus 1 is indicated as a light source emitting a laser beam upward (towards the objective lens) in order to show the emitted light and returning light in the optical pickup device wherein various optical parts of semiconductor laser apparatus 1, such as semiconductor laser 4, submount 3 and prism 5, are omitted in the figure.

As shown in FIG. 5(A), optical pickup apparatus 10 comprises semiconductor laser apparatus 1 of the present invention. The following are positioned in order from the side of semiconductor laser apparatus 1 to the side of optical recording medium 11: modulating diffraction grating 12, diffraction grating 13, ¼ wave plate 14, and objective lens 15.

In addition to the above described optical parts, semiconductor laser apparatus in FIG. 5(C) comprises an optical detector for detecting signals which detects recording signals, tracking error detection signals and focusing error detection signals.

To describe it in detail, semiconductor laser apparatus 1 of this embodiment comprises two pairs of optical detectors 20, 30 for detecting signals which are symmetrically placed on the sides of actual light source position 40 (reflection region 51 formed on slanted plane 50 of prism 5 in semiconductor laser apparatus shown in FIGS. 1 and 2). Light receiving planes of optical detectors 20, 30 for detecting signals are formed on the same surface 2a of semiconductor substrate 2 on which light receiving plane 6a of optical detector 6 for monitoring is formed. In this embodiment, optical detectors 20, 30 are formed in a region of surface portion 2b of semiconductor substrate 2 where the returning light from the recording medium, as indicated by a two-dotted line in FIG.

2, reaches after going through a region of slanted plane 50 of prism 5 to avoid reflection region 51 (transmissive refraction region 52). Light receiving planes of optical detectors 20, 30 for detecting signals can be formed in a region covered by prism 5 as shown in FIG. 2; however, it may be formed in a region to completely avoid prism 5 depending on the direction of diffraction of the returning light. In either case, same as light receiving plane 6*a* of optical detector 6 for monitoring, it is preferable to form the light receiving planes of the sensors on the surface of semiconductor substrate 2. If the light receiving planes of optical detectors 20, 30 for detecting signals are formed on surface 2*a* of semiconductor substrate 2, on which light receiving plane 6*a* of optical detector 6 for monitoring is formed, it is possible to produce both optical detectors in the same process such that costs of manufacturing semiconductor laser apparatus 1 can be dramatically reduced.

Optical detector 20 for detecting signals of a pair of optical detectors 20, 30 for detecting signals comprises optical detector 21 for detecting radio frequency (RF hereafter) signals which is located at the center to detect the returning light entirely and optical detectors 22, 23 for focusing errors and for tracking errors which are located on the sides of optical detector 21 for detecting RF signals.

The other optical detector 30 for detecting signals similarly comprises optical detector 31 for detecting RF signals which is located at the center and optical detectors 32, 33 for focusing errors and for tracking errors which are located on the sides of optical detector 31 for detecting RF signals.

Optical detectors 22, 23 and optical detectors 32, 33 are three-split type optical detectors. That is, optical detector 22 comprises three light receiving planes 22*a*, 22*b* and 22*c*; similarly, optical detector 23 comprises three light receiving planes 23*a*, 23*b* and 23*c*. Also, optical detector 32 and 33 comprise three light receiving planes 32*a*, 32*b* and 32*c*, and 33*a*, 33*b* and 33*c*, respectively.

Modulating diffraction grating 12 is positioned such that its diffraction direction is in the direction of track 11*b* of recording medium 11.

In FIG. 5(A), laser beam L2 emitted from semiconductor laser apparatus 1 receives a diffracting action while passing through modulating diffraction grating 12 and is divided mainly into three beams: 0th-order light beam L (0), +1st-order diffracted light beam L (+1) and −1st-order diffracted light beam L (−1).

The three beams are converted to circularly polarized light beams while passing through ¼ wavelength plate 14 after passing through diffraction grating 13 without being diffracted; thereafter, the beams enter objective lens 15. Via objective lens 15, the three beams are converged as optical spots a, b, c on track 11*b* formed on recording surface 11*a* of optical recording medium 11, as shown in FIG. 5(B).

Three returning beams Lr (0), Lr (+1), Lr (−1) reflected at optical recording medium 11 return to ¼ wavelength plate 14 via objective lens 15; after passing through ¼ wavelength plate 14, the returning beams are converted back to linearly polarized light beams. The diffraction direction of the linearly polarized light beams is switched to the direction perpendicular to the direction of laser beam L2. As a result, each of the three returning beams Lr (0), Lr (+1), Lr (−1) are diffracted into three beams by a diffracting action while passing through diffraction grating 13. The diffraction direction is perpendicular to the direction of track 11*b* of optical recording medium 11.

In other words, 0th-order light beam Lr (0) included in the three returning beams is diffracted into three beams: 0th-order light beam Lr (0)0, +1st-order diffracted light beam Lr (0)+1 and −1st-order diffracted light beam Lr (0)−1. Similarly, each of +1st-order diffracted light beam Lr (+1) and −1st-order diffracted light beam Lr (−1) are diffracted into three beams: 0th-order light beam Lr (+1)0, +1st-order diffracted light beam Lr (+1)+1 and −1st-order diffracted light beam Lr (+1)−1, and 0th-order light beam Lr (−1)0, +1st-order diffracted light beam Lr (−1)+1 and −1st-order diffracted light beam Lr (−1)−1, respectively.

Among the above diffracted light beams, +1st-order diffracted light beams Lr (0)+1, Lr (+1)+1 and Lr (−1)+1 are separately converged as optical spots a1, b1, c1 on the light receiving planes of optical detectors 21, 22 and 23, of which optical detector for detecting signals 20 is formed. On the other hand, −1st-order diffracted light beams Lr (0)−1, Lr (+1)−1 and Lr (−1)−1 are separately converged as optical spots a2, b2, c2 on the light receiving planes of optical detectors 31, 32 and 33, of which optical detector for detecting signals 30 is formed.

In optical pickup apparatus 10 of this embodiment, laser beam L2 is diffracted into three beams by using modulating diffraction grating 12. Among the optical spots of each beam formed on the recording surface of recording medium 11, as a result, astigmatism occurs in optical spots b, c located on the sides. Hence, as a result of imaging the returning light beams of these optical spots, the width of lateral aberration in meridianal astigmatism in optical spots b1, b2, and optical spots c1, c2 varies in the reverse direction according to the direction of deviation of a focus.

Figure 5D:
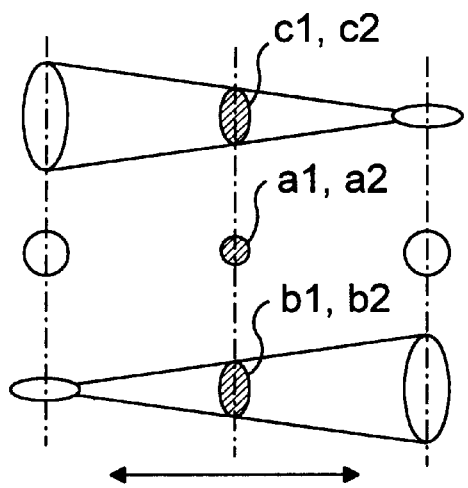

That is, as shown in FIG. 5(D), when they are in focus, optical spots b1, b2 and optical spots c1, c2 become ovals of the same size. On the other hand, when they are at the front focal points, the width of optical spots b1, b2 becomes narrower while the width of optical spots c1, c2 becomes broader. On the contrary, when they are at the back focal points, the width of optical spots b1, b2 becomes broader while the width of optical spots c1, c2 becomes narrower.

Therefore, focusing error signals FE can be generated by detecting the change in the widths of the optical spots as changes in the amount of light received by each optical detector. For example, as shown in FIG. 6(A), sum S1 between the amount of light (the intensity of the laser beam light) received at light receiving planes 22*a*, 22*c* and 32*a*, 32*c* located on the sides of three-split type optical detectors 23, 33, and the amount of light received at light receiving planes 23*b*, 33*b* located at the center of three-split type optical detectors 23, 33 positioned opposite from the above detectors is calculated. Also, sum S2 between the amount of light (the intensity of the laser beam light) received at light receiving planes 22*b*, 32*b* located at the center of three-split optical detectors 22, 32, and the amount of light received at light receiving planes 23*a*, 23*c* and 33*a*, 33*c* located on the sides of three-split optical detectors 23, 33 positioned opposite from the above detectors is calculated. Then, a difference between sum signals S1 and S2 is calculated to generate focusing error signal FE.

Tracking error signal TE is generated by a generally adapted three beam method. That is, as shown in FIG. 6(B), a difference between the sum S3; the amount of light (the intensity of the laser beam light) received of three-split type optical detectors 22, 32 and the sum S4; the amount of light (the intensity of the laser beam light) received of three-split optical detectors 23, 33 positioned opposite from the above detectors is calculated to generate tracking error signal TE.

On the other hand, an RF signal is detected based on the amount of light (the intensity of the laser beam light) received of optical detectors 21, 31 positioned at the center.

Optical detectors 21 through 23 and 31 through 33 in semiconductor laser apparatus 1 of this embodiment are just an example; the type of detectors shall be determined according to a method of detecting the focusing error signal and the tracking error signal. For example, in the case of detecting the focusing error signal by a conventional astigmatism method, a four-split type optical detector is used.

As described above, in the semiconductor laser apparatus of the present invention, a reflection region and a transmissive refraction region are formed on the slanted plane of a prism wherein a part of a laser beam, which is emitted from a semiconductor laser and enters the slanted plane of the prism, is converted to a light beam for monitoring which heads to a light receiving plane of an optical detector for monitoring formed on the surface of a semiconductor substrate. Thus, according to the present invention, a light beam with an amount of light (the intensity of the laser beam light) necessary for feedback control of the amount of light of a laser beam emitted from the semiconductor laser can be efficiently guided to the optical detector for monitoring, even when the light receiving plane of the optical detector for monitoring is parallel to the optical axis of a laser beam emitted from the semiconductor laser. Also, illumination efficiency of the semiconductor laser can be increased by increasing reflectivity at the rear end of the semiconductor laser such that a laser beam is focusingly emitted in the forward direction in relation to the semiconductor laser, in order to obtain both light beams for recording/reproducing and for monitoring from the laser beam which is emitted from the semiconductor laser in the forward direction.

In addition, if the light receiving planes of optical detectors for detecting signals are formed on the surface of the semiconductor substrate, on which the light receiving plane of the optical detector for monitoring is also formed, it is possible to produce both optical detectors in the same process such that costs of manufacturing the semiconductor laser apparatus can be dramatically reduced.

While the foregoing description and drawings represent the preferred embodiments of the present invention, it will be obvious to those skilled in the art that various changes and modifications may be made therein without departing from the true spirit and scope of the present invention.

What is claimed is:

1. A semiconductor laser apparatus comprising:

a semiconductor substrate;

a semiconductor laser which is fixed on said semiconductor substrate, said semiconductor laser emitting a forward light beam;

a prism having a slanted plane, said prism being placed such that its slanted plane faces a side across from said semiconductor laser; and an optical detector for detecting an amount of the emitted light beam based on said forward light beam emitted from said semiconductor laser and which is formed on the surface of said semiconductor substrate, said surface being covered by said prism;

wherein the following are formed on said slanted plane of said prism:

a reflecting region on which the surface is processed for reflecting said forward light beam from said semiconductor laser, said forward light beam being reflected on said reflection region being used for recording/reproducing optical recording media, an optical axis of said forward light beam going through said reflection region; and a transmissive refraction region on which the surface is processed such that a remaining part of said forward light beam emitted from said semiconductor laser is transmitted and refracted to be guided to a light receiving plane of said optical detector for monitoring, said reflection region being formed inside said transmissive refraction region.

2. The semiconductor laser apparatus described in claim 1 in which said reflection region is shaped as a stripe sandwiched by said transmissive refraction region.

3. The semiconductor laser apparatus described in claim 1 in which said reflection region is mounted on a submount placed on the surface of said semiconductor substrate.

4. The semiconductor laser apparatus described in claim 1 in which said reflection region is such that the optical reflective characteristic is provided by a metal coating.

5. An optical pickup device comprising:

a semiconductor laser apparatus described in claim 1 an objective lens which converges light beams reflected by said reflection region of said prism to a recording surface of an optical recording medium; and an optical detector for detecting signals which detects a recording signal, a tracking error detection signal and a focusing error detection signal from returning light beams returning from said optical recording medium via said objective lens.

6. The optical pickup device described in claim 5 which said optical detector for detecting signals comprises a light receiving plane formed on the surface of said semiconductor substrate.

* * * * *